Patented Nov. 1, 1932

1,885,780

UNITED STATES PATENT OFFICE

ERNST T. STILLE, OF CHICAGO, ILLINOIS

WOOD FILLER COMPOSITION

No Drawing. Application filed May 18, 1929. Serial No. 364,324.

The present invention relates to an improved wood filler composition for use with new wood that has to have its pores filled and which is later to be coated with lacquers or varnishes.

One of the objects of the invention is to provide a wood filler that, while effectively filling the pores of the wood, will dry so rapidly that the subsequent varnishing or lacquering operations may proceed within a short space of time after the filler has been applied, whereby an enormous saving in time is secured, and it becomes possible to finish wooden objects on a production basis with certainty and dispatch.

Another object of the invention is to provide a wood filler which combines within itself the properties of a fast-drying varnish and also of a pyroxylin lacquer, whereby, by reason of the presence of volatile solvents, the drying is greatly accelerated, and at the same time a proper surface is obtained to which either lacquer or varnish will adhere equally well.

Another object of the invention is to provide an improved wood filler that, while drying fast enough so that subsequent lacquering or varnishing operations may be perfected soon after its application, is nevertheless sufficiently retarded in drying to allow of wiping off the excess of the filler soon after application, as is necessary in wood-filling operations.

Other objects of the invention will appear in connection with the description hereinbelow.

The art of finishing wood, especially in the manufacture of pianos, fine furniture, radio cabinets, and the like, has advanced rapidly during the past few years, as the advent of the pyroxylin lacquers has made great changes in the composition of the materials applied to the wood and has greatly enhanced the speed with which these operations can be perfected. The modern low-viscosity cellulose nitrate products enable lacquer manufacturers to produce fast drying lacquers which combine the properties of an extremely tough film with resistance to abrasion. These lacquers are, however, quite different from the time-honored varnishes in that they do not depend upon oxidation for hardening, but dry merely by evaporation of the therein-contained organic solvents. Such lacquers, if applied directly to wood, are, however, rapidly absorbed by the latter by reason of the fact that the solvents therein contained have a relatively low viscosity, and are very penetrating in their nature. If such a lacquer were applied directly to wood, five or six coats would be necessary before a surface would be obtained sufficiently smooth to take a finishing coat. Even in the case of ordinary oil varnishes and resin varnishes, it is necessary first to fill the pores of the wood with a composition known as a wood filler before varnish can be applied with any degree of success.

Wood fillers in the past have usually consisted of what amounts to practically a dilute varnish containing in suspension certain hard pigments, such as silica, quartz, and the like; with the addition of suitable coloring matter, depending upon the effect sought to be attained. However, such wood fillers as were heretofore known have a drying time of from 8 to 36 hours, and hence it becomes necessary, if a large number of objects are to be frabricated, to supply an enormous space for drying purposes, thereby greatly increasing the cost of production. Many attempts have been made in the past to speed up the drying of wood fillers, but inasmuch as all of them depend upon, for drying, the oxidation of the thereincontained linseed oil, such drying is necessarily slow and uncertain.

In the improved lacquer type of wood filler which forms the subject matter of the present invention there have been combined, in novel form, a linseeed oil base, together with suitable dryers, asphaltum varnish, and a pyroxylin lacquer containing volatile solvents. Experiments have shown that there is a definite effect of the pyroxylin upon the linseed oil, especially if dilute oil is used, whereby the linseed oil becomes a part of the eventually formed pyroxylin film, acting as a softener therefor, so that there is no necessity for the oxidation of the linseed oil in order to have the wood filler dry rapidly. It is the reaction between the combination of the linseed oil and the cellulose nitrate in the pyroxylin lacquer, together with the blending of the asphaltum in the asphaltum varnish that leads to the surprisingly improved results obtained by the compositions hereinbelow described.

In producing a wood filler having a color suitable for finishing in lacquer, the following ingredients are combined substantially in the proportions given in the example hereinbelow.

In order that the formulæ may be properly understood, there will first be given the formulæ of a number of separately prepared products which enter into the final wood filler, and which are:

*Japan dryer heavy*

150 lbs. rosin
75 lbs. copal pontinaka
30 gals. linseed oil
60 gals. benzol (C. P.) (benzene)
30 gals. heavy petroleum naphtha (approximately 49° Bé. gravity)
60 lbs. litharge
30 lbs. red lead
30 lbs. cobalt resinate dryer

*Japan dryer light*

30 gals. linseed oil
60 gals. benzol (C. P.) (benzene)
30 gals. heavy petroleum naphtha (approximately 49° Bé. gravity)
60 lbs. litharge
30 lbs. red lead
30 lbs. cobalt resinate dryer

*Black liquid*

184 lbs. Cuban asphaltum
33½ lbs. gilsonite
4 gals. linseed oil
5¼ gals. kerosene
27½ gals. heavy petroleum naphtha (approximately 49° Bé. gravity)
49 gals. solvent naphtha

*Pyroxylin lacquer*

8 ozs. low viscosity cellulose nitrate
¾ gal. amyl acetate
¼ gal. butyl acetate

*Thinner*

15 gals. butyl acetate
10 gals. butyl alcohol
10 gals. ethyl acetate
35 gals. benzol (C. P.) (benzene)
25 gals. toluol (toluene)

Having the above ingredients on hand, the wood filler is then combined therefrom, together with the various pigments and the linseed oil, in accordance with the examples hereinbelow.

EXAMPLE I

*Mixture "A"*

178 lbs. soft silica
150 lbs. hard silica quartz
33 lbs. asbestine pulp
6 gals. boiled linseed oil
6 gals. japan dryer heavy (as above described)
1¾ gals. japan dryer light (as above described)
13 lbs. dry drop black
5½ lbs. burnt umber
1⅜ lbs. burnt sienna
4½ lbs. Van Dyke brown
3⅛ gals. black liquid (as above described)
2¾ gals. thinner (as above described)
1¾ gals. pyroxylin solution (as above described)

The materials comprised in the above formula are mixed in a tank provided with an agitator, the linseed oil, black liquid and japan dryer being worked in with the pigments, whereupon the pyroxylin solution is diluted with the thinner and the combined thinner and pyroxylin solution then gradually worked into the other ingredients while continuously stirring until a uniform pasty mixture is obtained.

The above mixture, termed "Mixture A", forms the basis of the actual wood filler, which itself is made up of the following:

16 lbs. mixture A
1½ gals. thinner (as above described)

EXAMPLE II 178 lbs. soft silica
183 lbs. hard quartz silica
33 lbs. asbestine pulp
6 gals. boiled linseed oil
6 gals. heavy japan dryer (as above described)
3 gals. light japan dryer (as above described)
2¾ gals. thinner (as above described)
1¾ gals. pyroxylin solution (as above described)

EXAMPLE III 148 lbs. soft silica
180 lbs. hard quartz silica
36 lbs. asbestine pulp
6 gals. boiled linseed oil
6 gals. heavy japan dryer (as above described)
1¾ gals. light japan dryer (as above described)
3 lbs. yellow ochre dry
1½ lbs. carbon black dry
2½ lbs. litharge
2¾ gals. black liquid (as above described)
2¼ gals. thinner (as above described)
1½ gals. pyroxylin solution (as above described)

EXAMPLE IV 173 lbs. soft silica
163 lbs. hard quartz silica
38 lbs. asbestine pulp
6 gals. boiled linseed oil
5½ gals. heavy japan dryer (as above described)
1½ gals. light japan dryer (as above described)
5 lbs. litharge
7 lbs. rose lake dry
3½ lbs. rose pink dry
1½ gals. black liquid (as above described)
1¾ gals. thinner (as above described)
1¼ gals. pyroxylin solution (as above described)

In any case, whether the mixture from Examples I, II, III or IV be used, the material is diluted with the thinner before being applied to the wood.

In using the wood filler made in accordance with the above examples, the same is applied, either with a brush or by means of an air gun, to the usually prepared smooth and sand-papered wood. The excess remaining on the surface of the wood is wiped off with a clean cloth or with waste after about three minutes, and the wood thereupon set aside for from 25 to 30 minutes, after which time it will be found that the wood filler has completely dried and the first coat of either varnish or lacquer may be applied. It will thus be seen that I have provided a very much improved type of wood filler which combines the qualities of a pyroxylin lacquer, those of a varnish, and which, after drying, forms a good base for the application of such varnish or lacquer.

The pigments, such as silica, quartz, asbestine pulp, drop black, umber, sienna and Van Dyke brown may be replaced (as shown in the above examples) with equally good results by any other suitable inert material having the color desired in the final finished wood article. In the manufacture of the dryers, variations in the proportions given, in accordance with the known art in the japan dryer field, may be made without departing from the invention. In the manufacture of the black liquid, while it is preferable to use the Cuban asphaltum, this may be substituted, in part, by additional gilsonite, although the results are more satisfactory when using the best grade of Cuban asphaltum in or about the proportions given in the black liquid formula. The thinner may be varied by using propyl acetate in place of some of the butyl acetate, and propyl or iso-propyl acetate may be used in place of the butyl alcohol.

Other variations in the composition of the individual ingredients, within the scope of the varnish and lacquer mixer's knowledge, can be made without departing essentially from the scope of the present invention, for which is claimed the following:

1. A wood filler comprising a vegetable drying oil, an inorganic resinate dryer, asphaltum varnish and pyroxylin lacquer, characterized by the property of rapidly drying when applied to the raw surface of wood.

2. A wood filler comprising a vegetable drying oil, an inorganic resinate dryer, asphaltum varnish, pyroxylin lacquer and inorganic pigments, characterized by the property of rapidly drying when applied to the raw surface of wood.

3. A wood filler comprising a composition resulting from the admixture of boiled linseed oil, japan dryer, asphaltum varnish, pyroxylin lacquer, and inorganic pigments, characterized by the property of rapidly drying when applied to the raw surface of wood.

4. A wood filler comprising a composition resulting from the admixture of boiled linseed oil and japan dryer including an inorganic resinate, asphaltum varnish, and pyroxylin lacquer, characterized by the property of rapidly drying when applied to the raw surface of wood.

5. A wood filler comprising a composition resulting from the admixture of boiled linseed oil, japan dryer including cobalt resinate, asphaltum varnish and pyroxylin lacquer, characterized by the property of rapidly drying when applied to the raw surface of wood.

6. A wood filler comprising a composition resulting from the admixture of boiled linseed oil, japan dryer including cobalt resinate, asphaltum varnish, pyroxylin lacquer, and inorganic pigments, characterized by the property of rapidly drying when applied to the raw surface of wood.

7. A wood filler comprising a composition resulting from the admixture of boiled linseed oil and japan dryer including cobalt resinate, asphaltum varnish, pyroxylin lacquer, silica, asbestine pulp, carbon and coloring matter, characterized by the property of rapidly drying when applied to the raw surface of wood.

8. A wood filler base comprising a composition resulting from the admixture of 178 pounds of soft silica 150 pounds hard silica quartz, 33 pounds asbestine pulp, 6 gallons boiled linseed oil, 6 gallons japan dryer heavy, 1¾ gallons japan dryer light, 13 pounds drop black dry, 5½ pounds burnt umber, 1⅜ pounds burnt sienna, 4½ pounds Van Dyke brown, 3⅛ gallons of black liquid, 1⅔ gallons pyroxylin lacquer thinner, 1¾ gallons pyroxylin lacquer, substantially as hereinabove described.

9. A very rapidly drying wood filler comprising the reaction product of boiled linseed oil and pyroxylin, in admixture with asphaltum varnish and inert pigments.

10. A very rapidly drying wood filler whose vehicle ingredient consists of boiled linseed oil, asphaltum varnish, and a pyroxylin solution.

In witness whereof, I have hereunto subscribed my name.

ERNST T. STILLE.